Figure 1:
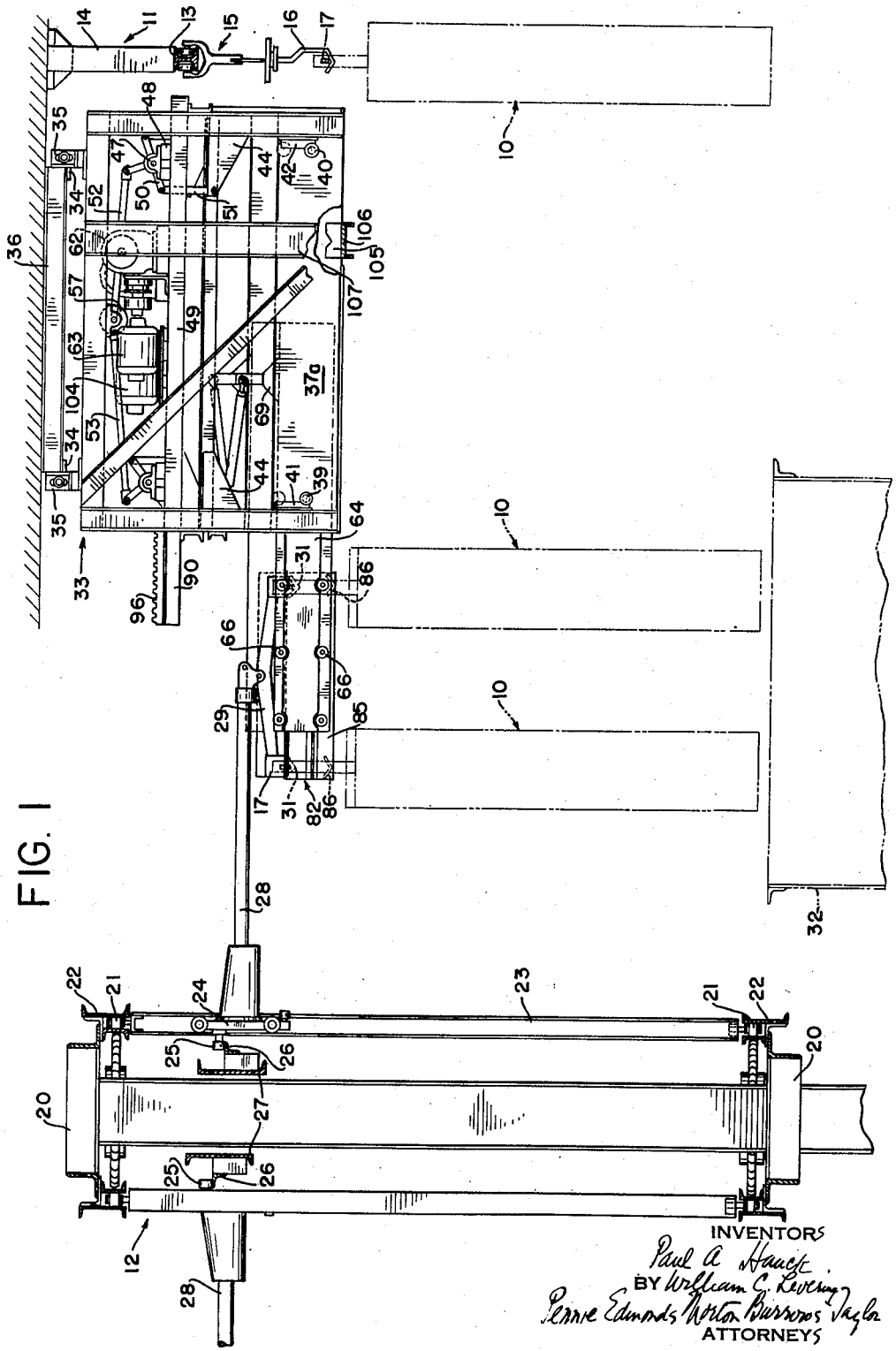

Sept. 24, 1957  P. A. HAUCK ET AL  2,807,349

TRANSFER MECHANISM

Filed Sept. 24, 1956  6 Sheets-Sheet 1

INVENTORS
Paul A. Hauck
BY William G. Levering
Pennie Edmonds Morton Burrows Taylor
ATTORNEYS Sept. 24, 1957 P. A. HAUCK ET AL 2,807,349
TRANSFER MECHANISM Filed Sept. 24, 1956 6 Sheets-Sheet 2

INVENTORS
Paul A. Hauck
BY William C. Levering
Pennie Edmonds Morton Barrows Taylor
ATTORNEYS

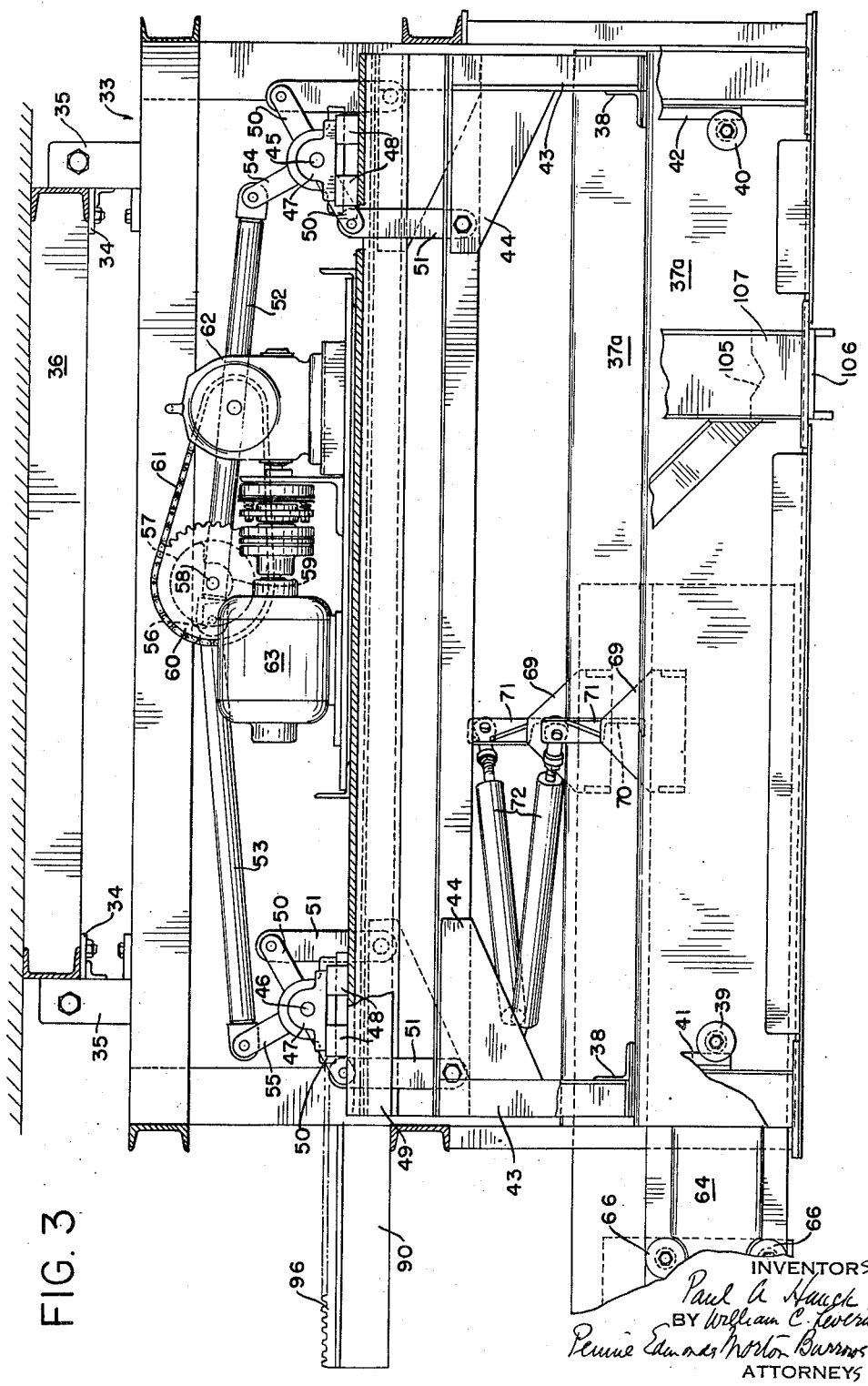

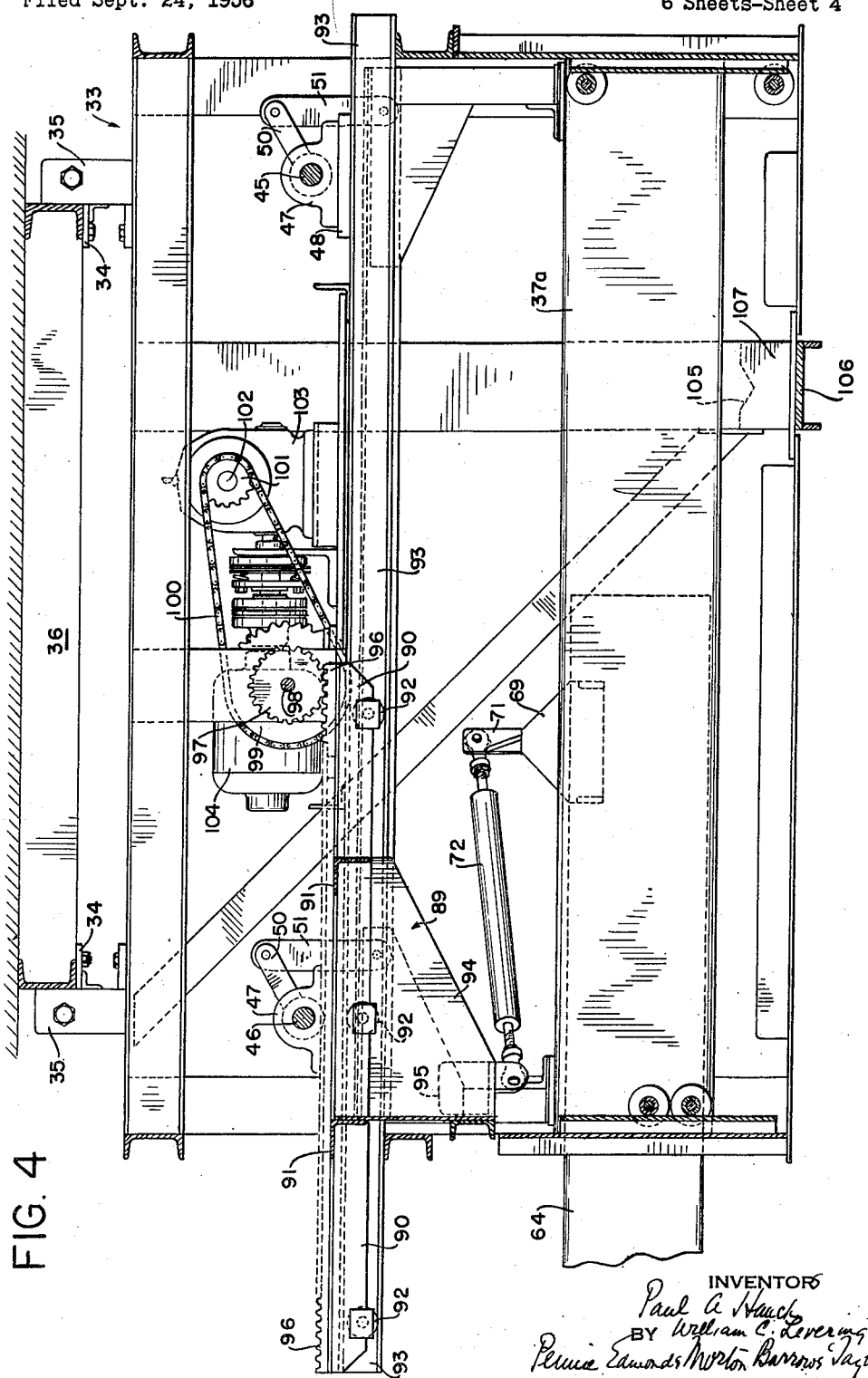

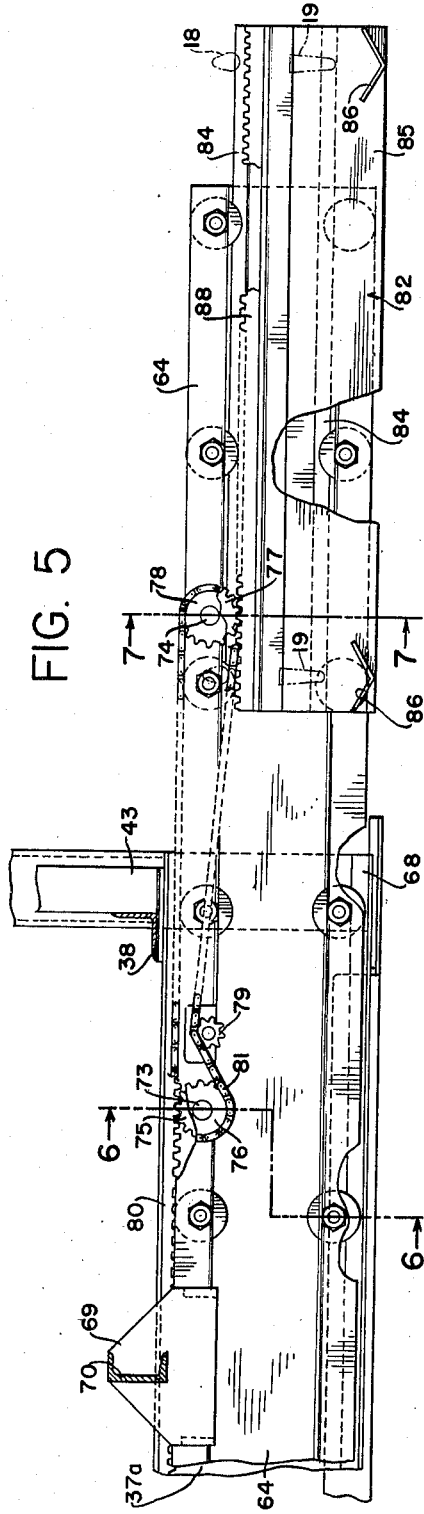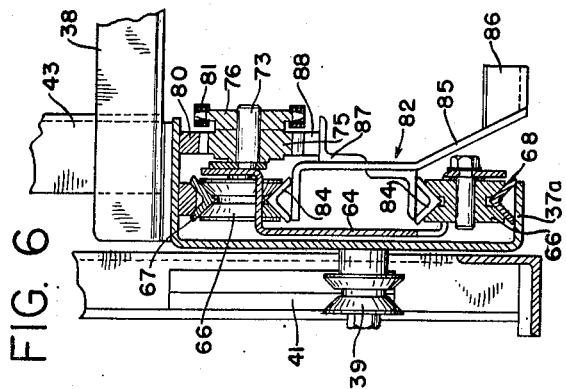

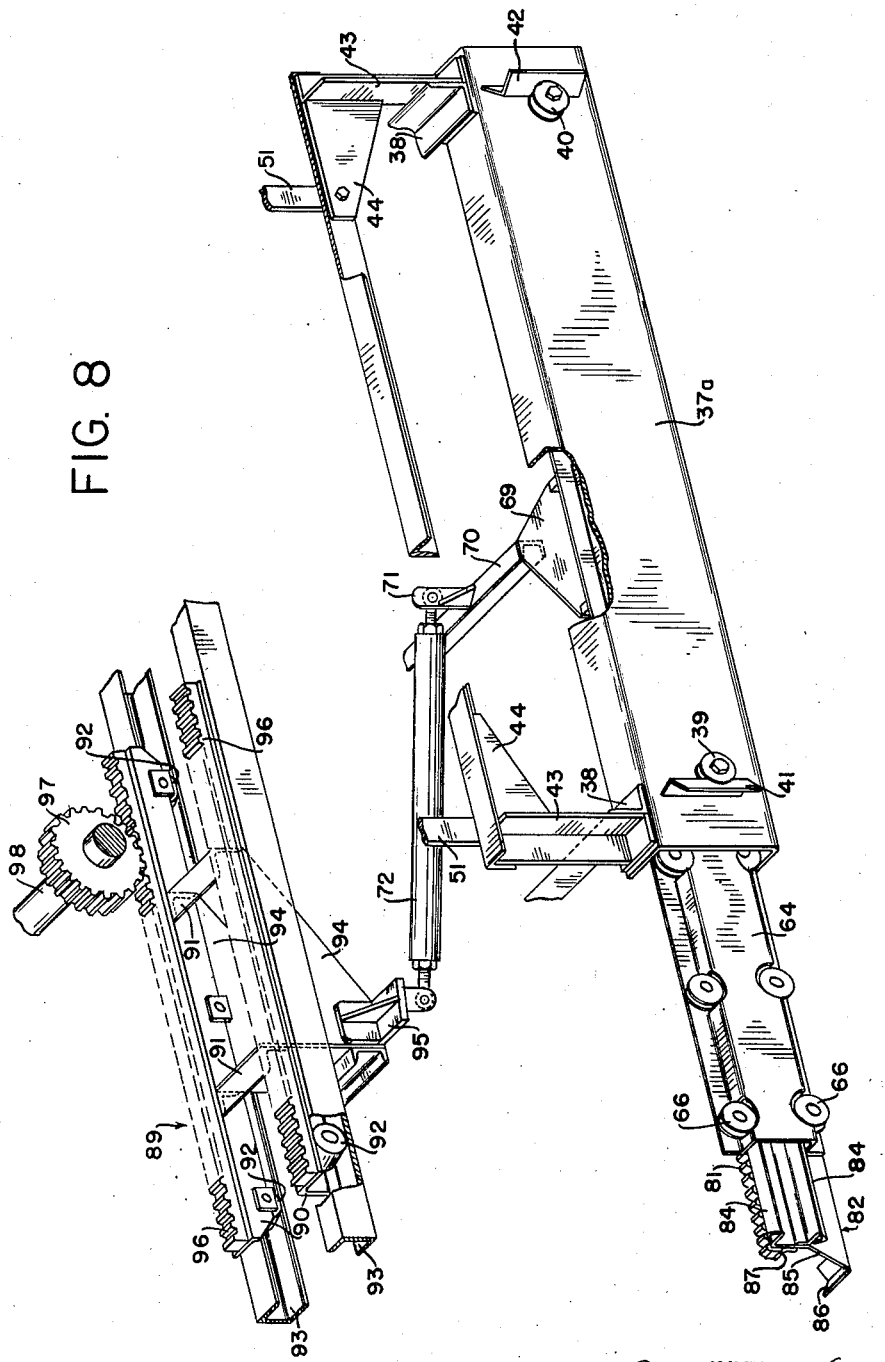

2,807,349

TRANSFER MECHANISM

Paul A. Hauck, Union, and William C. Levering, Martinsville, N. J., assignors to Hanson-Van Winkle-Munning Company, Matawan, N. J., a corporation of New Jersey Application September 24, 1956, Serial No. 611,607

11 Claims. (Cl. 198—20)

This invention relates to transfer mechanisms for use in connection with conveying systems for removing article carriers from one conveyor and delivering them to another. More particularly, the invention is concerned with a novel mechanism for automatically transferring article carriers between a pair of conveyors operating step-wise in timed relation with the carriers advanced in double file on one conveyor and in single file on the other. The new transfer mechanism can be employed for many purposes and is especially adapted for transferring article carriers between the conveyor of a processing machine, in which the articles are given various treatments, and a plant conveyor, by which the carriers loaded with raw work are delivered to the vicinity of the processing machine and the carriers with processed articles are taken away. Typical processing machines, with which the transfer mechanism may be used, include those for electroplating, heat treatment, anodizing, etc., and, since all the advantages of the invention are realized in its use with electroplating machines, a form of the transfer mechanism for that application will be illustrated and described in detail for purposes of explanation.

Electroplating machines include a plurality of tanks containing solutions for preliminary treatments, such as cleaning, etching, etc., one or more tanks, in which the plating operation is carried on, and a number of tanks for finishing treatments, such as hot and reclaim rinsing. The article carriers are moved along the tanks by a conveyor ordinarily operating stepwise and the carriers are raised from and lowered to successive tanks by an elevator. One form of plating machine conveyor in common use includes arms, which project over the tanks and can be raised and lowered relative to the remainder of the conveyor. The article carriers are suspended from the arms and, when the nature of the articles permits, it is common practice to hang two carriers from each arm, so that the carriers advance through the machine in double file.

The plant conveyor, which delivers the carriers with raw work to the station, where they are loaded upon the plating conveyor, and removes the carriers with finished articles from the station, where they are unloaded from the plating conveyor, operates in timed relation to the plating conveyor and ordinarily carries the carriers in single file. The loading and unloading stations of the plating conveyor may be adjacent or separated and, at each station, a transfer mechanism is commonly provided for transferring the carriers between the conveyors.

The present invention is directed to the provision of a transfer mechanism of the type referred to, which operates automatically and requires a relatively small amount of space for its installation and operation. The mechanism may be used as a loader for removing successive carriers with raw work from the plant conveyor and delivering them simultaneously to the machine conveyor as a pair for advance in double file, or the mechanism may be used as an unloader for simultaneously removing a pair of carriers with finished work from the machine conveyor and delivering them in succession to the plant conveyor for advance in single file. If desired, a pair of the mechanisms may be disposed side by side, so that, at adjacent stations, where the plant and machine conveyors stop in their step-wise movements, the machine conveyor can be unloaded and loaded, and, when this arrangement is used, the two mechanisms may have a common drive.

The new transfer mechanism includes a framework mounted at the side of the plating machine conveyor toward the plant conveyor and lifter means movable horizontally on the framework in either of two levels. The lifter means is provided with supports for engaging a pair of workpiece carriers at the spacing, at which they are advanced by the machine conveyor, and the framework has a landing station for supporting a single carrier, the station lying between the conveyors and spaced from the plane of movement of the plant conveyor by the distance between the carriers of a pair on the machine conveyor. The mechanism includes means for raising and lowering the lifter means and means for moving the lifter means horizontally in either level, and the raising and lowering means and the moving means cause the lifter means to move through a cycle, which varies according to whether the mechanism is used for loading or unloading the machine conveyor.

In some installations, it may be necessary because of space limitations to mount the framework of the transfer mechanism entirely between the plating machine and plant conveyors, and, in that case, the lifter means must be movable to and from a position, in which it projects out of the framework and intersects the plane of movement of the plant conveyor. A form of the mechanism suitable for use in the installation described comprises an elevator movable vertically on the framework and a main carriage mounted for horizontal movement on the elevator. A secondary carriage is mounted for horizontal movement on the main carriage and is provided with seats for supporting a pair of workpiece carriers at the spacing, at which they are carried on the machine conveyor. The mechanism includes means for moving the main carriage horizontally in both the up and down positions on the elevator and also means operable, whenever the main carriage is moved, for moving the secondary carriage in the same direction. The secondary carriage projects beyond the main carriage at both ends of the path of travel of the carriages, so that, when the carriages are in their extreme positions, they can be raised and lowered by the elevator to pick up or deposit workpiece carriers, but the carriages at the middle of their path of travel lie wholly within the framework and thus do not interfere with either of the conveyors.

Figure 2:
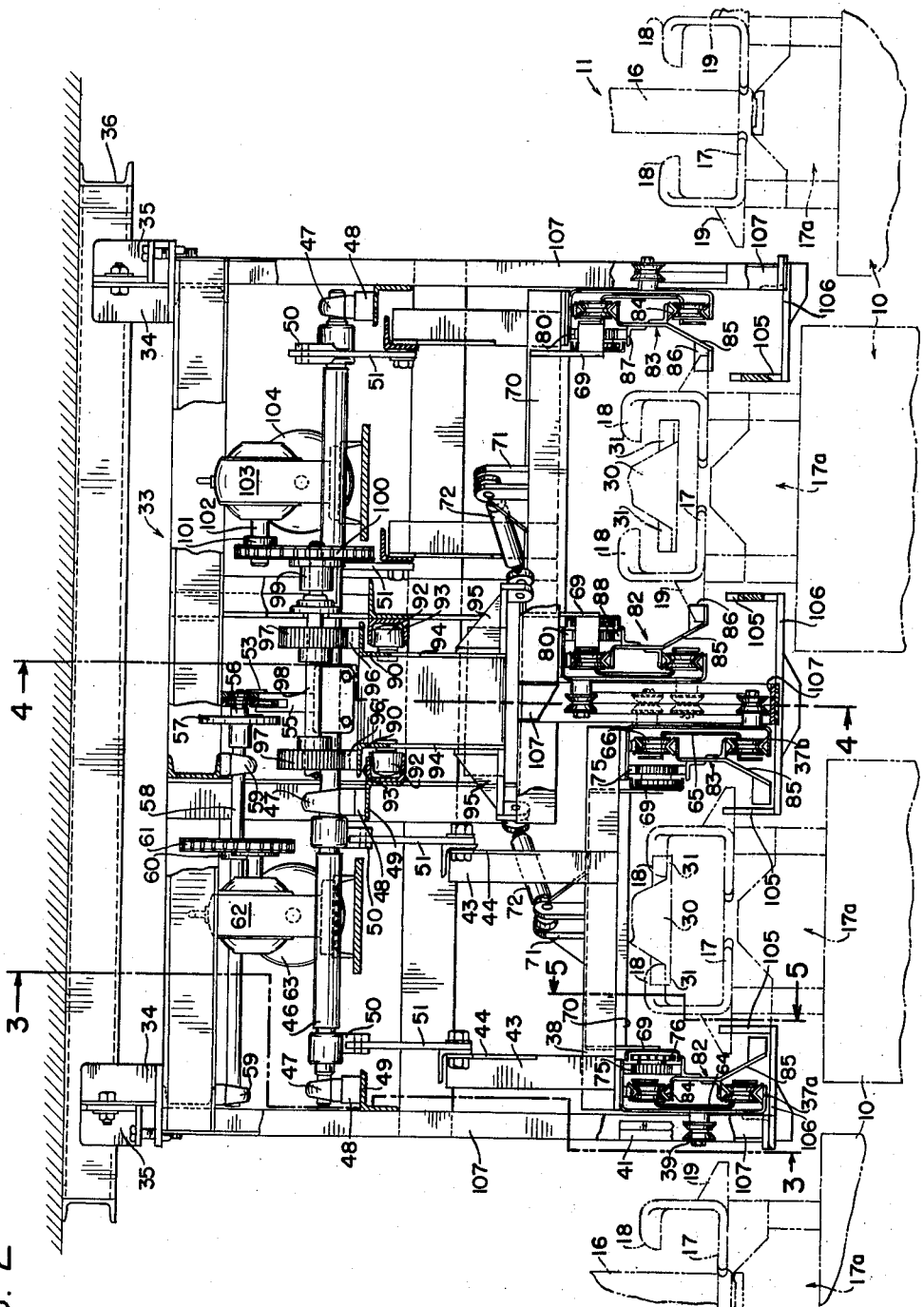

For a better understanding of the invention, reference may be made to the accompanying drawings, in which Fig. 1 is a view showing a pair of transfer mechanisms of the invention in elevation and installed between an electroplating machine and a plant conveyor, which are shown in vertical section;

Fig. 2 is an end elevational view of the transfer mechanism of Fig. 1;

Figs. 3, 4, and 5 are sectional views on the lines 3—3, 4—4, and 5—5, respectively, of Fig. 2;

Figs. 6 and 7 are sectional views on the lines 6—6 and 7—7, respectively, of Fig. 5; and Fig. 8 is a diagrammatic perspective view with parts broken away and removed of one form of the new mechanism.

The drawings show a pair of the new transfer mechanisms employed for transferring workpiece carriers in the form of racks 10 between a plant conveyor 11 and the conveyor of an electroplating machine 12. The mechanisms are mounted in a single supporting structure and are driven by a common driving means and one mechanism is used as a loader and the other as an unloader for the plating machine conveyor.

The plant conveyor illustrated is of the usual monorail type and it includes an I-beam 13 supported from the building structure by hangers 14 and serving as a rail, along which roll carriages 15. Each carriage 15 has a depending hook 16 engageable with a pick-up element 17 at the top of a rack 10. The pick-up element has a central opening 17a, above which are upwardly extending spaced hooks 18 with their ends pointing toward each other and ears 19 projecting outwardly from the roots of the hooks.

The plating machine may be of any of the usual constructions and that shown includes a frame 20, on which are mounted upper and lower conveyor chains with rollers 21 running in guideways 22 on the frame. The chains are connected by spaced pairs of channel members 23, between which are mounted carriages 24. Each carriage has a pick-up roller 25 engageable by a track 26 on an elevator structure having a beam 27 and each carriage carries an arm 28, to the outer end of which is attached a depending yoke 29 provided with spaced lifters 30 (Fig. 2) having outwardly projecting seats 31. Each lifter is of a size to pass between the opposed ends of hooks 18 on a rack, so that its seats may engage the hooks from beneath and support the rack. The racks carried on a yoke on an arm lie in line with the tanks 32 of the machine, which may be arranged in a closed series encircling the framework 20, and, in the operation of the machine, the conveyor advances stepwise with each step equal to the spacing between the centers of adjacent tanks. The plant conveyor 11 similarly moves stepwise in timed relation to the operation of the plating machine conveyor and at twice the speed thereof, so that, in the time interval, in which the machine conveyor advances one step, the plant conveyor advances two steps.

The loader-unloader is made up of a pair of single transfer mechanisms mounted in a common framework 33, which is made of structural members and is provided at the top with brackets 34 secured for vertical adjustment to lugs 35 mounted on a frame 36 attached to the building structure. Since the transfer mechanisms are alike, only one need be described in detail.

Each transfer mechanism includes an elevator made up of a pair of channel members 37a, 37b, which face each other and have their top flanges connected adjacent their ends by cross members 38. Each channel member carries grooved rollers 39, 40 mounted on outwardly projecting pins near its ends and the rollers are movable along vertical tracks 41, 42 attached to structural members of the framework. A pair of member 43 are attached to and extend upward from each cross member 38 and plates 44 are connected to the members 43 near their upper ends. A pair of shafts 45, 46 are mounted in bearing 47 on blocks 48 supported on horizontal structural members 49 of the framework and the shafts extend across the framework to overlie the elevators of both transfer mechanisms near opposite ends of the elevators. Each shaft carries a pair of arms 50 connected by links 51 to the plates 44 on members 43 of each elevator and the arms 50 on the shafts, which are connected to the same elevator, lie in the same angular relation to their shafts, while the arms connected to the other elevator lie spaced angularly 180° from the first arms. Accordingly, when one elevator is down, the other is up, as shown in Fig. 2.

The shafts 45, 46 are rocked to raise and lower the elevators by connecting rods 52, 53 attached at one end to arms 54, 55 on the respective shafts and, at the other, to an eccentric pin 56 on a disc 57 carried by a shaft 58. The shaft 58 is mounted in bearings 59 attached to structural members of the framework and carries a sprocket wheel 60 connected by a chain 61 to the output shaft of a gear reducing unit 62 mounted on the framework and driven by a reversible motor 63.

A main carriage is mounted on each elevator and includes a pair of channel members 64, 64 facing each other and having vertical flanges carrying pins, on which are mounted upper and lower series of grooved rollers 66 lying in cutouts in the upper and lower sides of the channels and engaging upper and lower tracks 67, 68 carried by the flanges of the channel members 37a, 37b of the elevators. The members 64, 65 carry plates 69 connected by a transverse channel member 70 carrying a lug 71, to which one end of a link 72, adjustable in length, is secured.

A pair of horizontal pins 73, 74 are mounted in spaced relation on the top vertical flange of each of the channel members 64, 65 of each main carriage and a pinion 75 and a sprocket wheel 76 are mounted on the pin 73 and connected together for rotation in unison. A pinion 77 and a sprocket wheel 78 are similarly mounted on pin 74 and an idler sprocket wheel 79 is mounted on a pin on each channel member between wheels 76 and 78. A rack 80 is mounted on the upper flange of each of the channel members 37a, 37b of each elevator to mesh with one of the pinions 75 and a chain 81 is trained about the sprocket wheels 76, 78 and passes over the idler sprocket wheel 79 between them.

A secondary carriage is mounted on each main carriage and comprises a pair of longitudinal members 82, 83 lying between the upper and lower sides of respective channel members 64, 65 of the main carriage. Each longitudinal member is provided with upper and lower tracks 84, and the tracks lie between and engage the grooved rollers 66 of the upper and lower series on the main carriage, on which the longitudinal member is mounted. Each longitudinal member is also provided with a flange 85 extending downwardly therefrom at an angle and carrying a pair of seats 86 in spaced relation. An angle member 87 is mounted on each longitudinal member to extend lengthwise thereof and a rack 88 mounted on each angle member meshes with the pinion 77 on the adjacent channel member of the main carriage.

The main carriages are reciprocated lengthwise by a shuttle 89, which includes a pair of horizontal angle members 90 connected by cross members 91 and provided with rollers 92 running in horizontal channel members 93 on the framework 33. The shuttle includes spaced downwardly extending plates 94, at the lower ends of which are mounted outwardly projecting brackets 95, to which the ends of links 72 are pivotally attached. A rack 96 is mounted on top of each member 90 of the shuttle and the racks mesh with gears 97 on a shaft 98 supported in bearings on framework 33 and carrying a sprocket wheel 99. A chain 100 conects the sprocket wheel 99 to a sprocket wheel 101 on the output shaft 102 of a reducing device 103 driven by a reversible motor 104 supported on the framework.

Each transfer mechanism is provided with a pair of seats 105 extending upwardly within its carriages and forming a landing station, at which a workpiece holder may be deposited. The seats are mounted on arms 106 attached to the lower ends of structural members 107 of the framework 33 and each landing station lies spaced from the plane of movement of the plant conveyor by a distance equal to the spacing between the pairs of seats on the yokes 29 on the arms on the plating machine conveyor.

The loader-unloader is installed with each transfer mechanism thereof lying between stations, at which the arms 28 on the plating conveyor and the carriages 15 on the plant conveyor come successively to rest. In the operation of the loader-unloader, the motors 63 and 104 are controlled by conventional control means including circuits containing limit switches closed in sequence by elements carried by one of the elevators and by one of the main carriages and the limit switches and circuits are so arranged that the motors cause the elevators and carriages to operate in a cycle as follows.

Assuming that the plating machine conveyor is moving in such a direction that the arms 28 thereon first stop at the station opposite the transfer mechanism at the left of Fig. 2, that mechanism unloads the workpiece carriers from the yokes on the arms and delivers the carriers to the plant conveyor. The transfer mechanism shown at the right in Fig. 2 is then employed to remove workpiece carriers from the carriages 15 on the plant conveyor and to load the carriers on the yoke of an arm on the machine conveyor, which has been unloaded at the preceding station.

When the carriages of the transfer mechanisms move in toward the machine conveyor, the elevator of the unloader is in the down position and the unloader is empty. The elevator of the loader is in the up position and both pairs of seats on its secondary carriage support carriers with raw workpieces. As the carriages of the transfer mechanisms move inwardly, the secondary carriages move relatively to their main carriages, so that, at the limit of inward movement of the carriages, the secondary carriages project beyond the main carriages, as shown in Fig. 1. In this position of the carriages, the seats on the secondary carriage of the unloader lie beneath and aligned with the pick-up elements 17 of workpiece carriers on the yoke 29 of an arm 28 of the plating machine conveyor. At the same time, the seats on the secondary carriage of the loader, which are supporting workpiece carriers, lie aligned with and above empty seats on the yoke on the arm of the machine conveyor at the loading station.

With the carriages in their inmost positions, the elevator on the unloader rises and that on the loader moves down. In such movement of the elevators, the seats on the secondary carriage on the unloader engage the pick-up elements on workpiece carriers on the yoke on the arm at the unloading station and raise the carriers free of the yoke, while the workpiece carriers, which were previously supported on the seats on the secondary carriage of the loader mechanism, are deposited in the seats on the yoke on the conveyor arm at the loading station. The vertical movements of the elevators are such that the seats on the unloader hold the pick-up elements of the holders removed from the seats on the yoke at a level above the yoke seats, while the seats on the loader have moved down below the level of the seats on the yoke. With the elevators in these positions, the carriages are moved to the outer ends of their paths of travel and they come to rest with their outer seats in the plane of movement of the carriages on the plant conveyor and their inner seats aligned vertically with the landing stations.

When the carriages of the loader and unloader are in their extreme outward positions, the pick-up elements 17 on the workpiece carrier in the outer and inner seats on the secondary carriage of the unloader lie, respectively, above an empty hook 16 on the plant conveyor and above the landing station of the unloader. At the same time, the outer and inner seats on the secondary carriage of the loader lie, respectively, beneath the lugs 19 of a pick-up element of a workpiece holder on the hook of a carriage on the plant conveyor and beneath the landing station of the loader. The elevators then reverse their positions with the elevator of the loader rising and that of the unloader falling. As the loader elevator rises, the outer seats on the secondary carriage of the loader engage the pick-up element of the workpiece holder on the aligned plant conveyor carriage and lift the holder free of the hook of the carriage, while the inner seats rise empty, since the landing station is empty. As the elevator of the unloader moves down, the workpiece holder in the outer seats on the secondary carriage of the unloader is deposited upon the hook of a carriage on the plant conveyor, while the workpiece holder in the inner seats of the secondary carriage is deposited upon the landing station.

In the next step in the cycle of operations of the loader-unloader, the carriages of the two transfer mechanisms move inward and come to rest with the outer seats on the secondary carriage of the unloader beneath and aligned with the unloader landing station, while the outer seats on the secondary carriage of the loader lie above and aligned with the loader landing station. When the carriages have reached the positions stated, the unloader elevator rises and the loader elevator moves down. In such movement, the outer seats on the secondary carriage on the unloader pick up the workpiece holder previously deposited at the landing station, while the outer seats on the secondary carriage on the loader deposit the workpiece holder carried thereby at the loader landing station. When the elevator movements have been completed, the carriages move out to the limit of their movement toward the plant conveyor.

During the movement of the carriages of the two transfer mechanisms above described, in which a workpiece holder is deposited at the landing station of one mechanism and a holder is raised from the landing station of the other, the carriages on the plant conveyor have advanced by one step, so that an empty carriage has been placed in alignment with the unloader and a full carriage in alignment with the loader.

When the short outward movement of the carriages of the transfer mechanisms from the landing stations has been completed, the pick-up element of the workpiece holder in the outer seats on the secondary carriage on the unloader lie aligned with and above a hook 16 on a carriage on the plant conveyor. At the same time, the empty outer seats on the secondary carriage of the loader lie beneath and aligned with the pick-up elements on a workpiece holder in a hook 16 on a carriage of the plant conveyor. The elevators of the mechanisms then reverse positions and, as the loader elevator rises, the outer seats on the secondary carriage of the loader raise the workpiece holder from a carriage on the plant conveyor and the inner seats on the secondary carriage of the loader raise the workpiece holder previously deposited at the loader landing station. When the unloader elevator moves down, the workpiece holder carried in the outer seats of the secondary carriage of the unloader is deposited upon the hook of a carriage of the plant conveyor. The secondary carriage of the loader now carries two workpiece holders loded with raw work and the secondary carriage of the unloader is empty.

In the next stage in the cycle of operations of the loader-unloader, the carriages move the limit of their inward movement with the loader carriages supported by the loader elevator at the high level and the carriages of the unloader supported by the unloader elevator at the low level. When the carriages of the two transfer mechanisms reach the inner limit of their movement, the cycle of operations is complete.

The transfer mechanism illustrated and described in detail is especially adapted for use in locations, in which it is not permissible to have any part of the framework of the mechanism intersect the plane of movement of the plant conveyor. Under such conditions, the use of the secondary carriage and the landing station makes it possible to remove a pair of workpiece holders simultaneously from a yoke on an arm on the machine conveyor and to deliver these carriers one at a time to carriages on the plant conveyor with the secondary carriage intersecting the plane of movement of the plant conveyor, while supported by framework lying at one side of that plane. If the landing station were not used, the deposition on a hook on the plant conveyor of the workpiece holder carried by the inner seats of a carriage would require that the carriage extend through the plane of movement of the plant conveyor until its inner seats were aligned with the hook. With a framework lying wholly at one side of the plane of movement of the plant conveyor, it would be difficult to provide adequate support for a carriage projecting so far from the framework.

In installations, in which it is permissible to extend the framework of the transfer mechanism through the plane of movement of the plant conveyor, the mechanism may be simplified by elimination of the secondary carriage and the seats for picking up workpiece holders are then mounted directly on the main carriage. However, with such a construction, it is still desirable to provide the landing station, since the use of the station reduces the length of the path of travel of the carriage.

In the transfer mechanism illustrated, the lifter means include a carriage moving on a track on an elevator, by which the lifter means is raised and lowered. It will be apparent that it is not necessary that the carriage be raised and lowered and, if preferred, the carriage may be reciprocated on a stationary track and carry lifter means, which can be raised and lowered relative to the carriage.

I claim:

1. A mechanism for transferring workpiece carriers between a conveyor advancing spaced pairs of carriers in double file and a second conveyor advancing the carriers in spaced relation in single file, which comprises a framework lying at the side of the first conveyor toward the second, lifter means having supports for engaging a pair of carriers lying abreast on the first conveyor, a landing station for a single carrier mounted on the framework between the conveyors and spaced from the plane of movement of the second conveyor by the distance between the carriers of a pair on the first conveyor, means for raising and lowering the lifter means between two levels, and means for moving the lifter means horizontally transverse to the conveyors in either level, the raising and lowering means and the moving means operating to cause the lifter means to function in a cycle, in which the lifter means advances in one level from the first conveyor to the second, moves to the second level and returns to the landing station, moves to the first level and advances to the second conveyor, moves to the second level and returns to the first conveyor, and moves to the first level.

2. The transfer mechanism of claim 1, in which a second lifter means is mounted on the framework for horizontal movement parallel to the first lifter means, a landing station is provided for the second lifter means, and the two lifter means are operated by the raising and lowering means and the moving means with the same cycle of movements except that the two lifter means move vertically in opposite directions, so that, when one lifter means moves horizontally in one level, the other lifter means moves in the same direction in the other level.

3. The transfer mechanism of claim 1, in which the lifter means includes a carriage movable horizontally relatively to the framework.

4. The transfer mechanism of claim 3, in which an elevator on the framework moves the carriage between upper and lower levels and the elevator has guiding means on which the carriage is movable horizontally.

5. The transfer mechanism of claim 3, in which the elevator is connected to arms secured to rock shafts and is raised and lowered as the shafts rock in opposite directions.

6. The transfer mechanism of claim 3, in which a second carriage is mounted for horizontal movement on the first carriage in the direction of movement of the latter, and means are provided for moving the second carriage in the same direction as the first carriage, whenever the first cariage is moved horizontally.

7. The transfer mechanism of claim 6, in which the first carriage is mounted on an elevator, and the movement of the second carriage on the first carriage is effected by means carried by the elevator and carriages.

8. The transfer mechanism of claim 7, in which a rack on the elevator is engaged by and causes rotation of a pinion on the first carriage, when the carriage moves horizontally, a second pinion on the first carriage is connected to and driven by the first pinion, and a rack fast on the second carriage is engaged by the second pinion and advanced with the second carriage by rotation of the second pinion.

9. The transfer mechanism of claim 6, in which the second carriage has spaced lifter elements for supporting workpiece carriers.

10. The transfer mechanism of claim 4, in which a shuttle is mounted for horizontal movement transverse to the conveyors in a single level on the framework, and the shuttle is connected to the carriage to move the latter in either level.

11. A transfer mechanism, which comprises a framework, an elevator movable vertically on the framework, a main carriage mounted for horizontal movement on the elevator, a secondary carriage mounted for horizontal movement on the main carriage, means on the secondary carriage and spaced lengthwise thereof for supporting a pair of workpiece carriers, means on the framework connected to the main carriage for moving said carriage in both the down and up positions of the elevator, and means on the elevator and carriages operable when the main carriage is moved for moving the secondary carriage in the same direction, the secondary carriage projecting beyond the main carriage at both ends of the path of travel of the carriages with one carrier support on the secondary carriage lying beyond the main carriage.

No references cited.